United States Patent
Yashima et al.

(10) Patent No.: US 10,901,233 B1
(45) Date of Patent: Jan. 26, 2021

(54) IMAGE FORMING APPARATUS AND IMAGE FORMING METHOD USING A LENTICULAR LENS SHEET

(71) Applicant: FUJI XEROX CO., LTD., Tokyo (JP)

(72) Inventors: Shun Yashima, Kanagawa (JP);
Hirotaka Nomoto, Kanagawa (JP);
Tomoya Ishizaki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/854,925

(22) Filed: Apr. 22, 2020

(30) Foreign Application Priority Data

Nov. 11, 2019 (JP) .................. 2019-204049

(51) Int. Cl.
  *G03G 15/01* (2006.01)
  *G02B 30/27* (2020.01)

(52) U.S. Cl.
  CPC ........... *G02B 30/27* (2020.01); *G03G 15/01* (2013.01)

(58) Field of Classification Search
  CPC ........... G03G 15/5041; G03G 15/5054; G03G 15/5058; G03G 15/5062; B41J 3/407; G02B 30/27; G03B 35/00
  USPC .................................................... 399/49, 301
  See application file for complete search history.

(56) References Cited

U.S. PATENT DOCUMENTS 9,919,515 B2 * 3/2018 Daniell et al. ........... B41J 3/407

FOREIGN PATENT DOCUMENTS

| JP | H1115086 | 1/1999 |
| JP | H11352441 | 12/1999 |
| JP | 2010250143 | 11/2010 |

* cited by examiner

*Primary Examiner* — William J Royer
(74) *Attorney, Agent, or Firm* — JCIPRNET

(57) ABSTRACT

An image forming apparatus includes an image forming section that forms a pattern image for detecting image-position displacement with respect to a lenticular lens sheet. The pattern image includes periodic images in each of which set images, each including two or more images of different shades and having a length equal to a lens pitch of the lenticular lens sheet, are arranged in a lens transverse direction of the lenticular lens sheet. The periodic images are arranged in a lens longitudinal direction of the lenticular lens sheet so as to be gradually shifted from one another in the lens transverse direction by a distance less than the lens pitch.

11 Claims, 14 Drawing Sheets

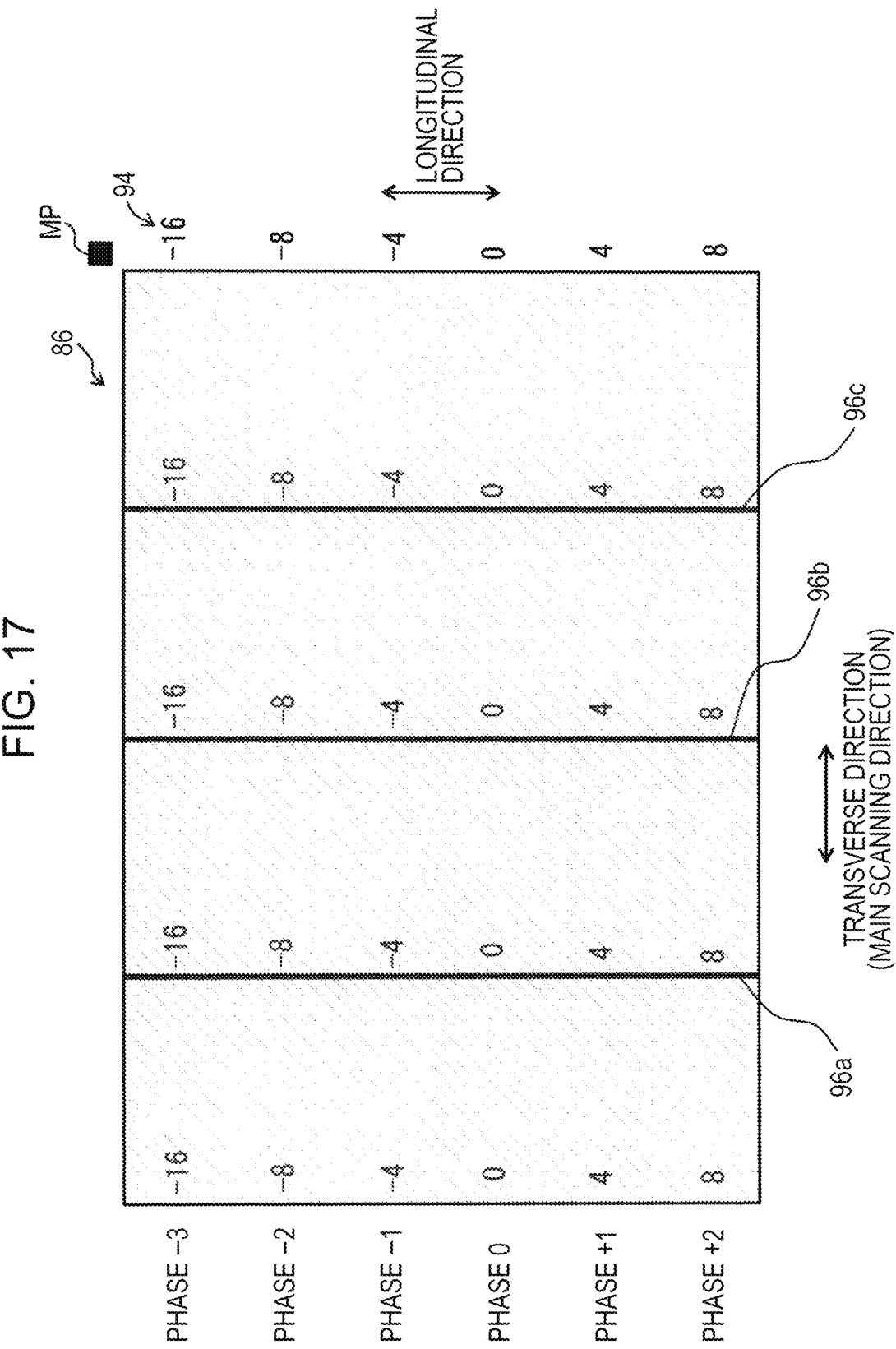

IMAGE FORMING APPARATUS AND IMAGE FORMING METHOD USING A LENTICULAR LENS SHEET

CROSS-REFERENCE TO RELATED APPLICATIONS

This application is based on and claims priority under 35 USC 119 from Japanese Patent Application No. 2019-204049 filed Nov. 11, 2019.

BACKGROUND

(i) Technical Field

The present disclosure relates to an image forming apparatus and an image forming method.

(ii) Related Art

Known lenticular printed materials allow viewers to feel a sense of perspective, a stereoscopic sense, a motion change, and the like when viewing planar images. In a lenticular printed material, for example, collective images each including multiple strip-like images cut out from multiple parallax images are arranged so as to correspond to the lenses of a lenticular lens sheet. In this configuration, the strip-like images extending in the lens longitudinal direction of the lenticular lens sheet are arranged side-by-side in the lens transverse direction.

Methods of producing lenticular printed materials include a method in which an image is directly printed on a lenticular lens sheet and a method in which an image sheet having an image is bonded to a lenticular lens sheet. The lenticular lens sheet is also called a lenticular screen, a lenticular plate, a lenticular sheet, a lens sheet, and the like, and the lenses of the lenticular lens sheet are also called cylindrical lenses and the like.

Japanese Unexamined Patent Application Publication No. 2010-250143 discloses an image sheet on which a composite image is formed and which is bonded to a lenticular sheet to provide a stereoscopic vision or a change of an image. The composite image has multiple image units (corresponding to collective images) corresponding to cylindrical lenses, each having multiple strip-like images, and arranged in parallel. The image sheet includes an image area on which the composite image is formed and a pattern area on which adjustment patterns to be used for positioning between the image sheet and the lenticular sheet are formed.

Japanese Unexamined Patent Application Publication No. 11-15086 discloses a lenticular-display-body bonding method for forming a lenticular display body by bonding a lenticular plate having cylindrical lenses arranged in parallel and a composite image formed by combining multiple parallax images. In this method, straight lines extending in the longitudinal direction of the cylindrical lenses are provided at specific positions on the composite image, and, when the straight lines are in a specific state when the composite image is observed through the lenticular plate, it is determined that the relative positions of the lenticular display body and the composite image are correct, and the lenticular display body and the composite image are bonded together.

Japanese Unexamined Patent Application Publication No. 11-352441 discloses a method of producing a lenticular printed material in which a lenticular screen and a printed material are bonded together. In the method, gauges having patterns, in which straight lines having a predetermined width are arranged in parallel at predetermined intervals, are printed on the printed material, and the printed material and the lenticular screen are positioned relative to each other on the basis of images of the gauges viewed through the lenticular screen.

SUMMARY

When an image is formed directly on a lenticular lens sheet or on an image sheet to be bonded to a lenticular lens sheet by using an image forming apparatus, the image may be displaced in the lens transverse direction of the lenticular lens sheet. When such positional displacement occurs, a desired image cannot be observed on the lenticular printed material. Hence, it is desirable to detect image-position displacement in the lens transverse direction, caused by the image forming apparatus.

Aspects of non-limiting embodiments of the present disclosure relate to detecting image-position displacement in the lens transverse direction of a lenticular lens sheet, caused by an image forming apparatus.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image forming apparatus including: an image forming section that forms a pattern image for detecting image-position displacement with respect to a lenticular lens sheet. The pattern image includes periodic images in each of which set images, each including two or more images of different shades and having a length equal to a lens pitch of the lenticular lens sheet, are arranged in a lens transverse direction of the lenticular lens sheet, and the periodic images are arranged in a lens longitudinal direction of the lenticular lens sheet so as to be gradually shifted from one another in the lens transverse direction by a distance less than the lens pitch.

BRIEF DESCRIPTION OF THE DRAWINGS

Exemplary embodiments of the present disclosure will be described in detail based on the following figures, wherein:

FIG. 17 schematically shows the entirety of another pattern image.

DETAILED DESCRIPTION

Exemplary embodiments of the present disclosure will be described in detail below with reference to the attached drawings. The configuration described below is an example for explanation and thus can be changed as appropriate according to the specifications of an image forming apparatus, the form of a lenticular lens sheet, and the like. If there are multiple exemplary embodiments and modifications, it is assumed that features thereof are combined as appropriate. It is also to be noted that like reference signs designate identical or corresponding components throughout the drawings, and redundant explanations are omitted.

Exemplary embodiments of the present disclosure relate to correcting an image forming apparatus for forming an image on a lenticular lens sheet (or "a lens sheet") and, more specifically, correcting positional displacement (or image-position displacement) of an electrostatic latent image in the main scanning direction of an exposure device of an image forming apparatus. When this is performed, a pattern image is formed on a lens sheet with the image forming apparatus, and an operator views the pattern image by eye from the lens side of the lens sheet, reads (acquires) adjustment values included in the pattern image on the basis of a linear pattern grasped by viewing, and inputs the thus-read adjustment values to an operation unit (or "an input unit") of the image forming apparatus.

Figure 1:
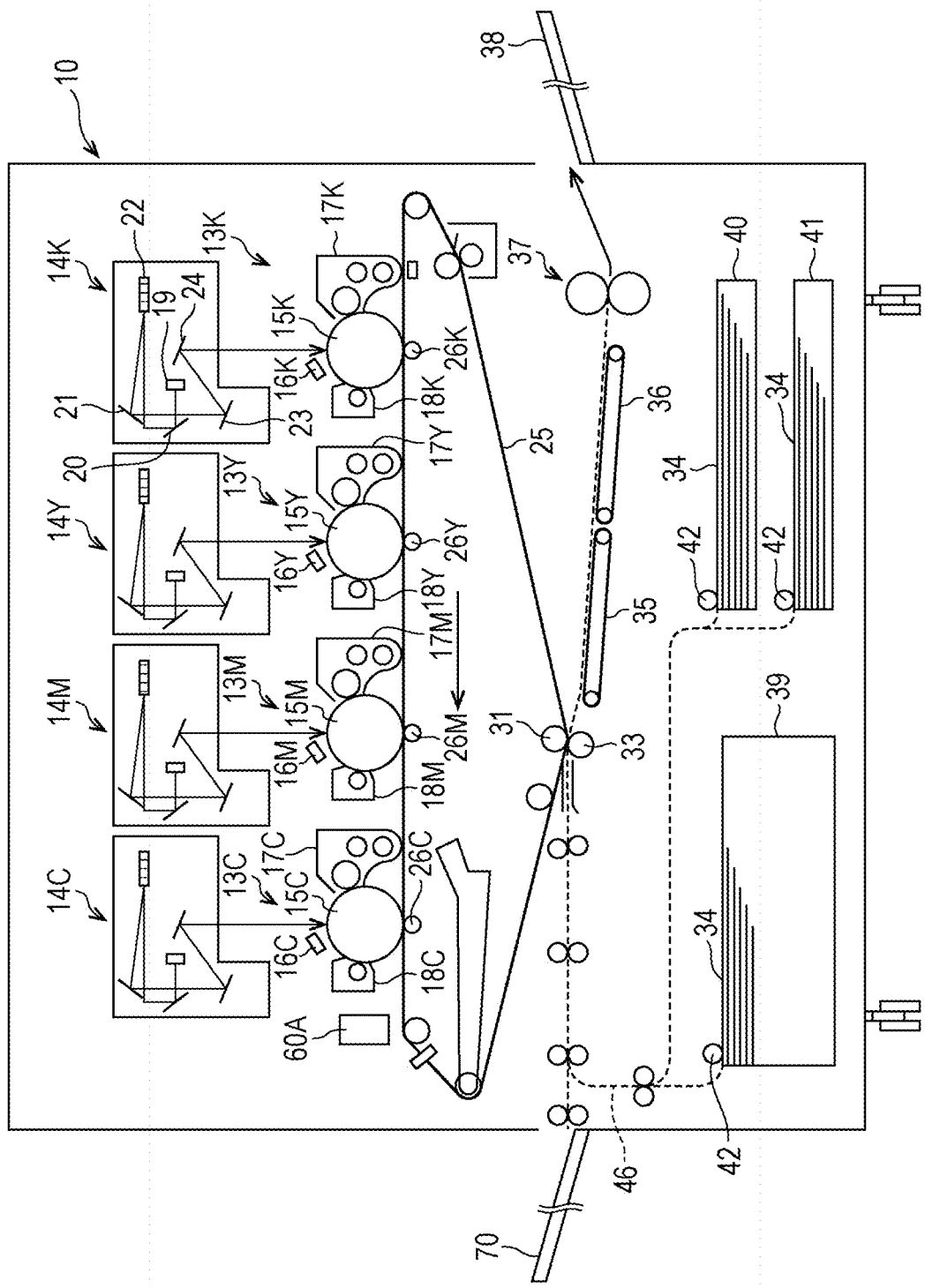
FIG. 1 schematically shows the configuration of an image forming apparatus.

FIG. 1 schematically shows the configuration of an image forming apparatus 10 according to an exemplary embodiment of the present disclosure. The image forming apparatus 10 receives image data from outside. The received image data is converted into black (K), yellow (Y), magenta (M), and cyan (C) image data (raster data), and the raster data of the respective colors is transmitted to exposure devices 14K, 14Y, 14M, and 14C of image forming units 13K, 13Y, 13M, and 13C corresponding to the respective colors. In the drawings and the description below, components related to forming a black image are denoted by reference signs with a suffix K, components related to forming a yellow image are denoted by reference signs with a suffix Y, components related to forming a magenta image are denoted by reference signs with a suffix M, and components related to forming a cyan image are denoted by reference signs with a suffix C.

The image forming units 13K, 13Y, 13M, and 13C form black, yellow, magenta, and cyan toner images, respectively. Because all the image forming units have the same structure, the suffixes K, Y, M, and C are omitted when distinguishing is unnecessary. Hereinbelow, the image forming unit 13K will be explained as a representative example.

The image forming unit 13K includes a photoconductor drum 15K that rotates at a predetermined rotation speed, a charger 16K that uniformly charges the surface of the photoconductor drum 15K, an exposure device 14K that exposes the surface of the photoconductor drum 15K with light to form an electrostatic latent image corresponding to black-color raster data, a developing device 17K that develops the electrostatic latent image formed on the photoconductor drum 15K with toner, and a cleaning device 18K for removing the toner on the photoconductor drum 15K. The image forming units 13K, 13Y, 13M, and 13C function as image forming members that develop electrostatic latent images formed on the photoconductor drums 15 by the exposure devices 14 and form a multi-color image on a printing medium 34.

The exposure device 14K emits a laser beam from a laser device 19 according to the black-color raster data. The laser beam emitted from the laser device 19 is guided to a rotating polygon mirror 22, which has a regular polygonal shape and has multiple reflection surfaces on the side surfaces thereof, by reflecting mirrors 20 and 21 and is reflected by the polygon mirror 22. The light reflected by the rotating polygon mirror 22 is reflected again by the reflecting mirror 21 and multiple reflecting mirrors 23 and 24 so as to be scanned over the photoconductor drum 15K, serving as an image carrier. Thus, an electrostatic latent image is formed on the surface of the photoconductor drum 15K. The electrostatic latent images formed on the photoconductor drums 15K, 15Y, 15M, and 15C are developed as black, yellow, magenta, and cyan toner images, respectively, by the developing devices 17K, 17Y, 17M, and 17C. More specifically, the exposure devices 14, which are provided so as to correspond to the respective colors, form electrostatic latent images on the photoconductor drums 15 by scanning the laser beam in the main scanning direction according to the supplied raster data.

The black, yellow, magenta, and cyan toner images formed on the photoconductor drums 15K, 15Y, 15M, and 15C are transferred, in a superimposed manner, to an intermediate transfer belt 25 disposed below the image forming units 13K, 13Y, 13M, and 13C by first transfer rollers 26K, 26Y, 26M, and 26C. The intermediate transfer belt 25 is stretched over multiple rollers with a certain tension and is driven in a circulating manner in the direction indicated by the arrow, at a predetermined speed by a rotationally driven roller. The intermediate transfer belt 25 is an endless belt.

The black, yellow, magenta, and cyan toner images transferred in the superimposed manner to the intermediate transfer belt 25 are second-transferred to the printing medium 34 by a second transfer roller 33 pressed against a roller 31, and the printing medium 34 to which the color toner image has been transferred is transported to a fixing device 37 by transport belts 35 and 36 arranged in tandem. The printing medium 34 to which the color toner image has been transferred is heated and pressed (fixing processing) by the fixing device 37 and is output onto a paper output tray 38 provided outside the image forming apparatus 10.

The printing medium 34 is fed out, via a roller 42, to a medium transport path 46 from one of multiple paper containers 39, 40, and 41 accommodating printing media 34 and is transported to the intermediate transfer belt 25. The printing medium 34 can also be fed from a manual-feed tray 70 to the intermediate transfer belt 25. After the toner image on the photoconductor drum 15 is transferred, residual toner, paper dust, and the like on the photoconductor drum 15 are removed by the cleaning device 18 for the next image forming process. The residual toner on the intermediate transfer belt 25 is removed by a belt cleaner.

Figure 2:
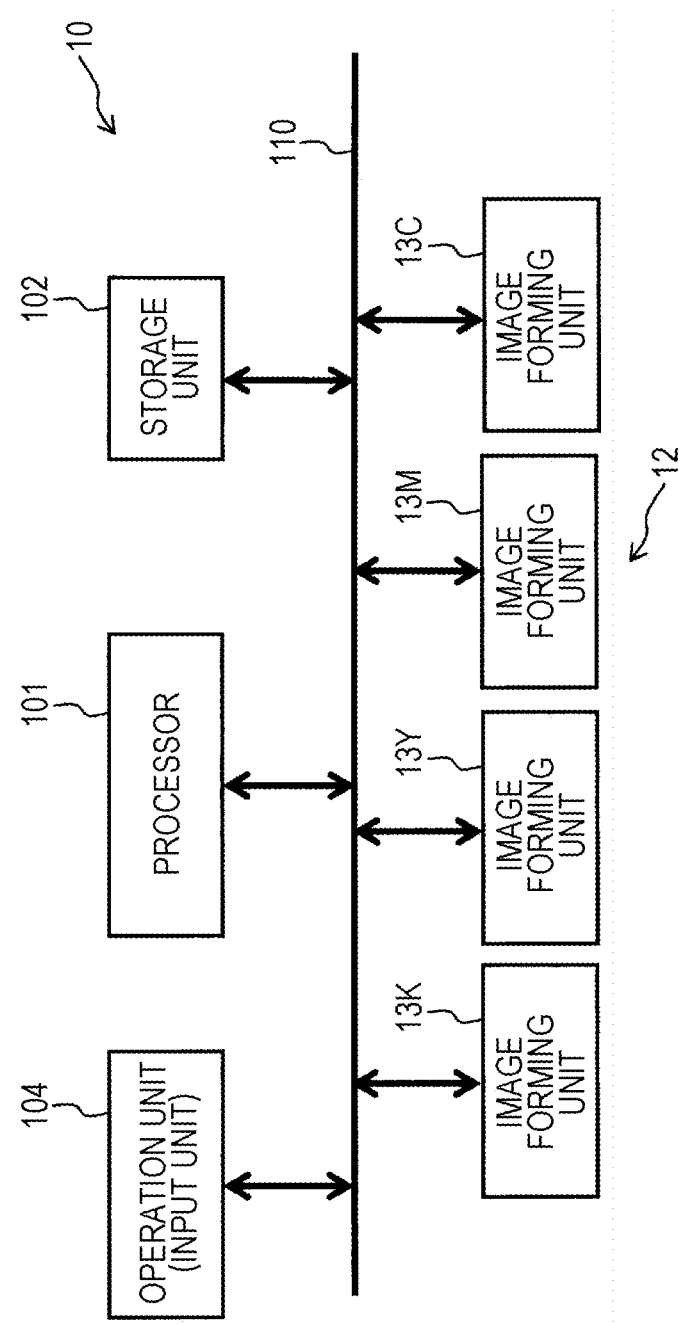
FIG. 2 is a block diagram showing a control structure of the image forming apparatus.

FIG. 2 is a block diagram showing the control structure of the image forming apparatus 10. As shown in FIG. 2, the image forming apparatus 10 includes a processor 101, a storage unit 102, an operation unit 104 (input unit), and the image forming units 13K, 13Y, 13M, and 13C. These components are connected to one another via a bus or a line 110. The image forming units 13K, 13Y, 13M, and 13C are also collectively referred to as an image forming section 12.

The processor 101 controls the overall image forming apparatus 10. In FIG. 2, the illustration of some components (for example, a print-medium transport mechanism, detectors 60A, 60B, and 60C described below, etc.) controlled by the processor 101 is omitted. In the processor 101, a processor for controlling the overall system of the image forming apparatus 10 and a processor for image processing may be separated. The storage unit 102 is, for example, a read-only memory (ROM), a random-access memory (RAM), a flash memory, or a hard disk and stores a pattern image and the like (described below). The operation unit 104 includes, for example, a touch screen and a keypad for providing various information to an operator of the image forming apparatus 10 by displaying a menu screen, messages, and the like and for receiving instructions from the operator.

Figure 3:
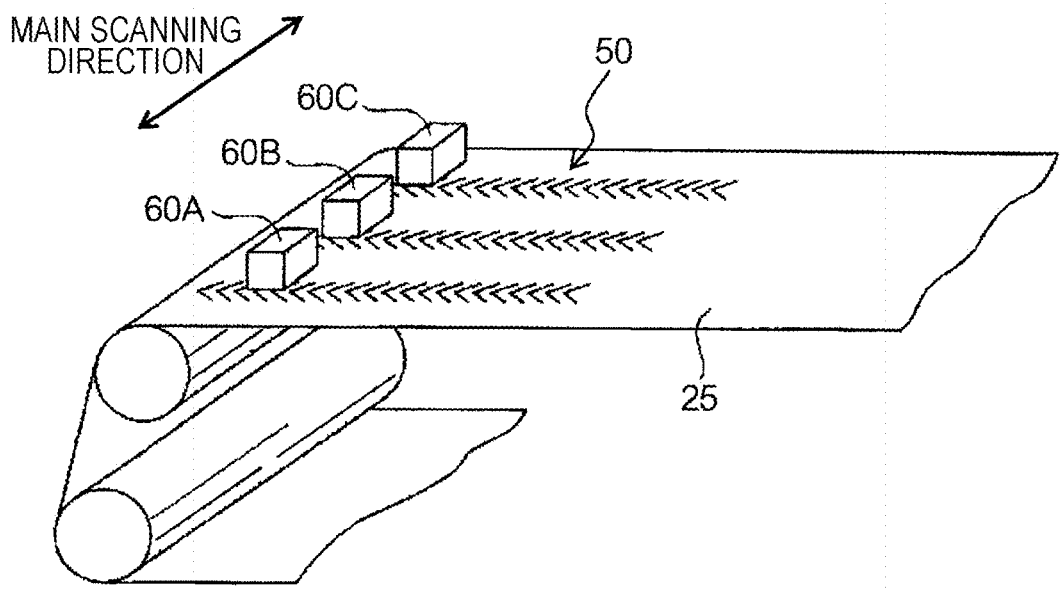
FIG. 3 schematically shows the arrangement of detectors.

As shown in FIG. 3, the image forming apparatus 10 includes detectors 60A, 60B, and 60C arranged side-by-side in the width direction of the intermediate transfer belt 25, which is equal to the main scanning direction of the exposure device. The detectors 60A, 60B, and 60C detect test patterns 50 for detecting color misregistration, which are transferred to the intermediate transfer belt 25. In the example in FIG. 3, the detectors 60A, 60B, and 60C are disposed on the near side, the center, and the far side of the image forming apparatus 10, respectively.

Figure 4:
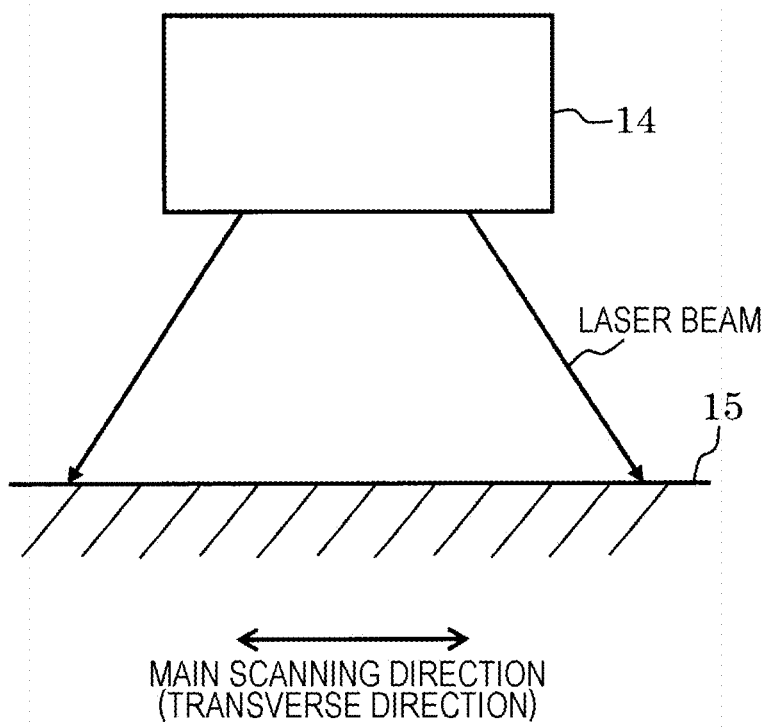
FIG. 4 shows an exposure device scanning a photoconductor drum with a laser beam in a main-scanning direction.
Figure 5:
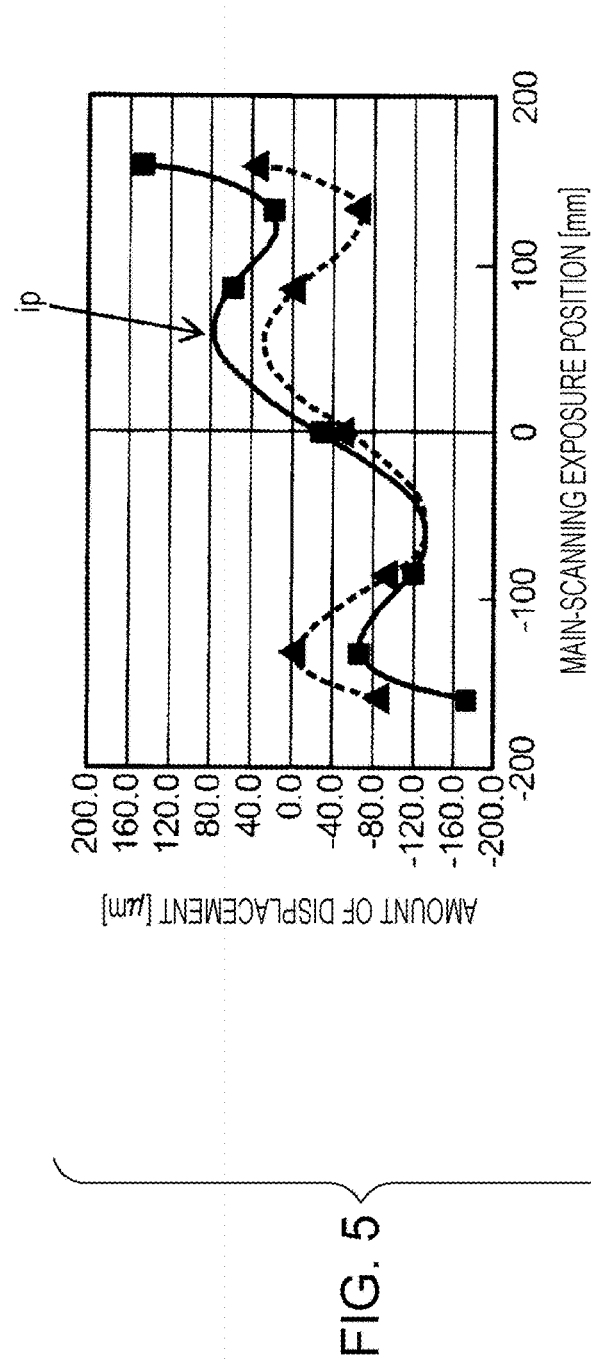
FIG. 5 shows an example of the amounts of displacement of the main-scanning exposure position.

As shown in FIG. 4, the exposure device 14 of the image forming unit 13 scans a laser beam in the main scanning direction over the photoconductor drum 15 to form an electrostatic latent image thereon. At this time, the position where the electrostatic latent image is formed (or "a main-scanning exposure position") in the main scanning direction may be displaced from the target position. FIG. 5 shows an example of the amounts of displacement of the main-scanning exposure position. FIG. 5 shows the amounts of displacement of the electrostatic latent images formed by the exposure devices 14C and 14Y of the image forming units 13C and 13Y, measured outside the image forming apparatus 10 before the cyan and yellow image forming units 13C and 13Y are assembled into the image forming apparatus 10. In the graph in FIG. 5, the horizontal axis represents the position in the main scanning direction, and the vertical axis represents the amount of displacement of the image from the target position (the displacement amount in the main scanning direction). FIG. 5 shows the displacement amounts at seven positions (from the first position (left end of exposure) to the seventh position (right end of exposure)) in the main scanning direction. Triangular dots in the graph indicate the displacement amounts with the yellow exposure device, and rectangular dots indicate the displacement amounts with the cyan exposure device. The points where the amount of displacement turns from increase to decrease or from decrease to increase are called inflection points ip.

As shown in FIG. 5, the displacement amount in the main scanning direction varies in the main scanning direction. Hence, when an image is formed on a lenticular lens sheet with the image forming apparatus 10 such that the main scanning direction is equal to the transverse direction of the lenticular lens sheet, it may be partially or entirely impossible to feel an intended sense of perspective, stereoscopic sense, and motion change in the transverse direction of the lenticular lens sheet. Although the cyan and yellow exposure devices 14C and 14Y have been described here, the displacement amounts with the black and magenta exposure devices 14K and 14M are also measured in the same way.

Figure 6:
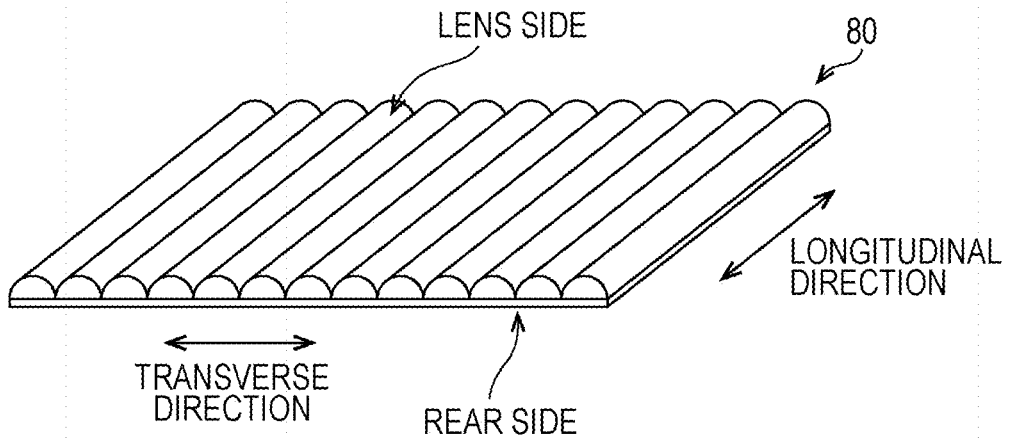
FIG. 6 shows a part of a lenticular lens sheet.

An image forming operation of forming an image on a lenticular lens sheet with the image forming apparatus 10 will be described. FIG. 6 shows a portion of a lenticular lens sheet 80. The lenticular lens sheet 80 is a substantially transparent sheet in which semi-cylindrical narrow cylindrical lenses (simply, "lenses") are arranged at a constant pitch. The lens longitudinal direction is a direction in which the lenses extend, and the lens transverse direction is a direction in which the lenses are arranged side-by-side.

The image forming apparatus 10 forms an image on the rear side (opposite to the lens side) of the lenticular lens sheet 80. The operator places the lens sheet on the manual-feed tray 70 (see FIG. 1) with the lens side of the lens sheet facing down. At this time, the lens sheet is disposed on the manual-feed tray 70 such that the lens longitudinal direction of the lens sheet is equal to the transport direction in the image forming apparatus 10, and such that the lens transverse direction is equal to the main scanning direction of the exposure device 14. The lens sheet is transported from the manual-feed tray 70 to the intermediate transfer belt 25, and the toner image on the intermediate transfer belt 25 is second-transferred to the rear side of the lens sheet. Then, the lens sheet goes through the fixing processing by the fixing device 37 and is discharged onto the paper output tray 38.

Figure 7:
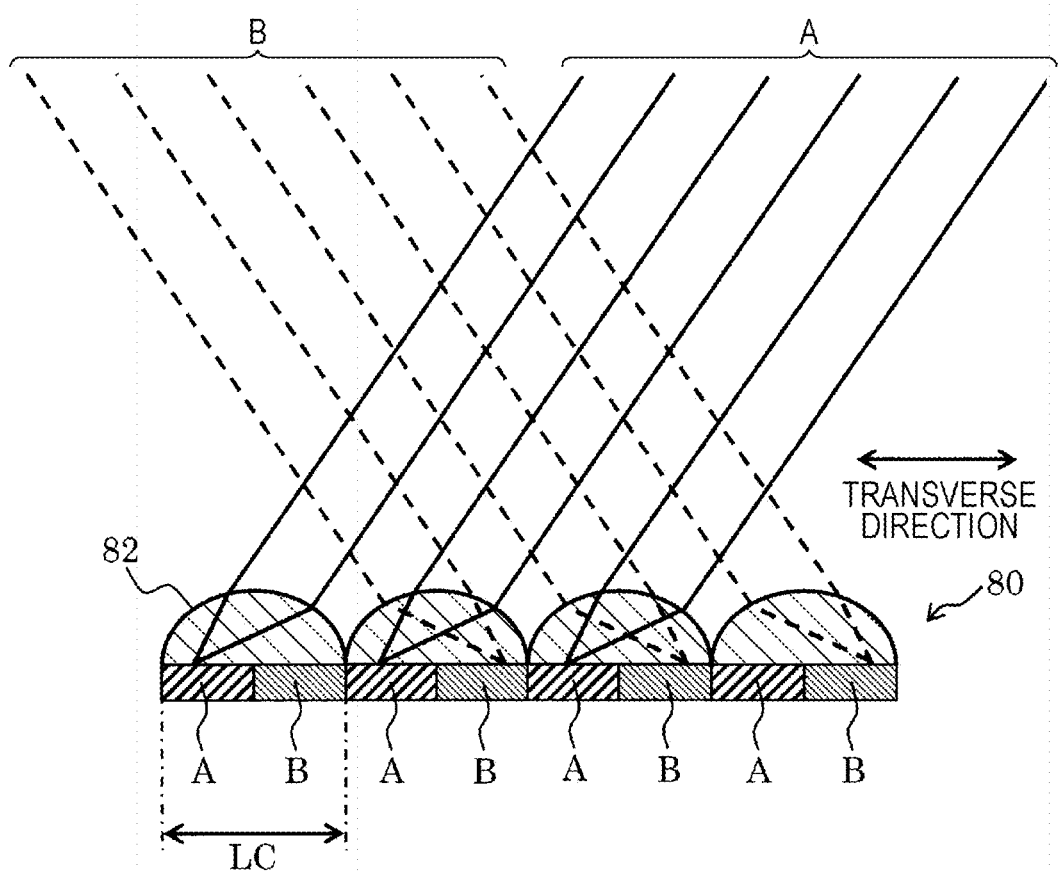
FIG. 7 shows a change in focus resulting from a change in a visual point relative to the lenticular lens sheet.

FIG. 7 shows an example of the lenticular lens sheet 80 (or "a lenticular printed material") on which the image has been formed. In the image formed on the lenticular lens sheet 80, collective images each having multiple strip-like (or belt-like) images cut out from multiple parallax images are disposed so as to correspond to the lenses of the lenticular lens sheet 80. In FIG. 7, the collective images (A-B pairs) each having two strip-like images cut out from two parallax images A and B are arranged at a lens pitch LC. As shown in FIG. 7, the focal positions of the lenses change with the angle from which the lenticular lens sheet 80 is viewed from the lens side, and the image observed by a viewer changes between A and B. To obtain this effect, the collective images need to be accurately disposed relative to the lens positions. However, as described above, because the image forming position may be displaced in the main scanning direction (the lens transverse direction) due to the exposure device 14, the positions of the collective images may be displaced. Hence, the exposure device 14 needs to be corrected. A method of correcting the exposure device 14 according to the exemplary embodiment of the present disclosure (or "a method of correcting the image forming section") will be described below.

Figure 8:
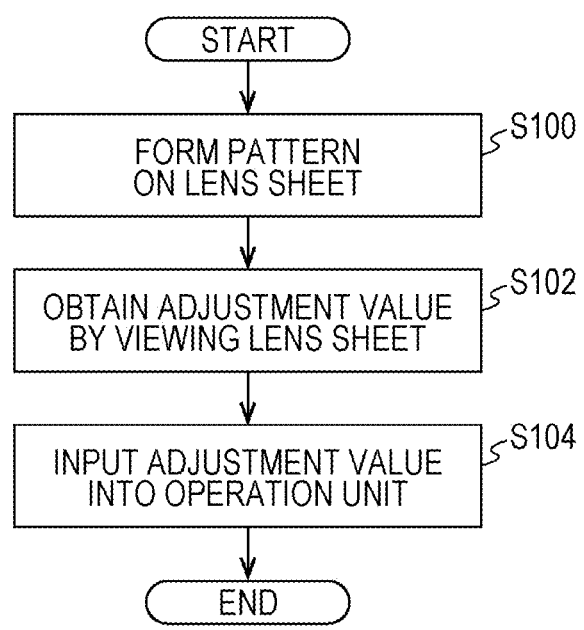
FIG. 8 is a flowchart showing a process in an exposure-device correcting method.

FIG. 8 is a flowchart showing the process in an exposure-device correcting method (or "an adjustment method"). Although the flow in FIG. 8 is individually performed on each of the black, yellow, magenta, and cyan exposure devices 14, herein, the correction of the black exposure device 14K will be described as an example.

Figure 9:
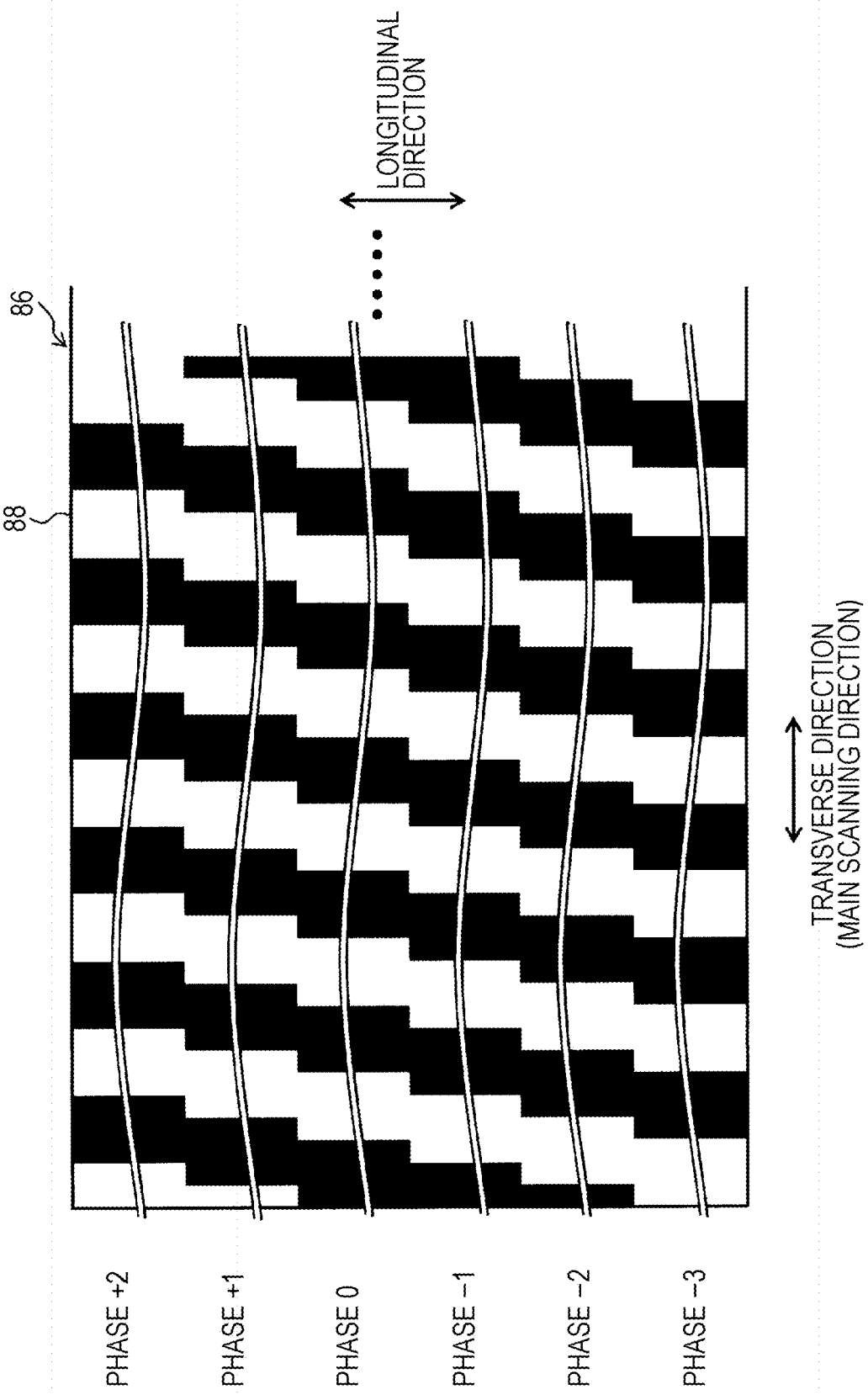
FIG. 9 shows a part of a pattern image.
Figure 10:
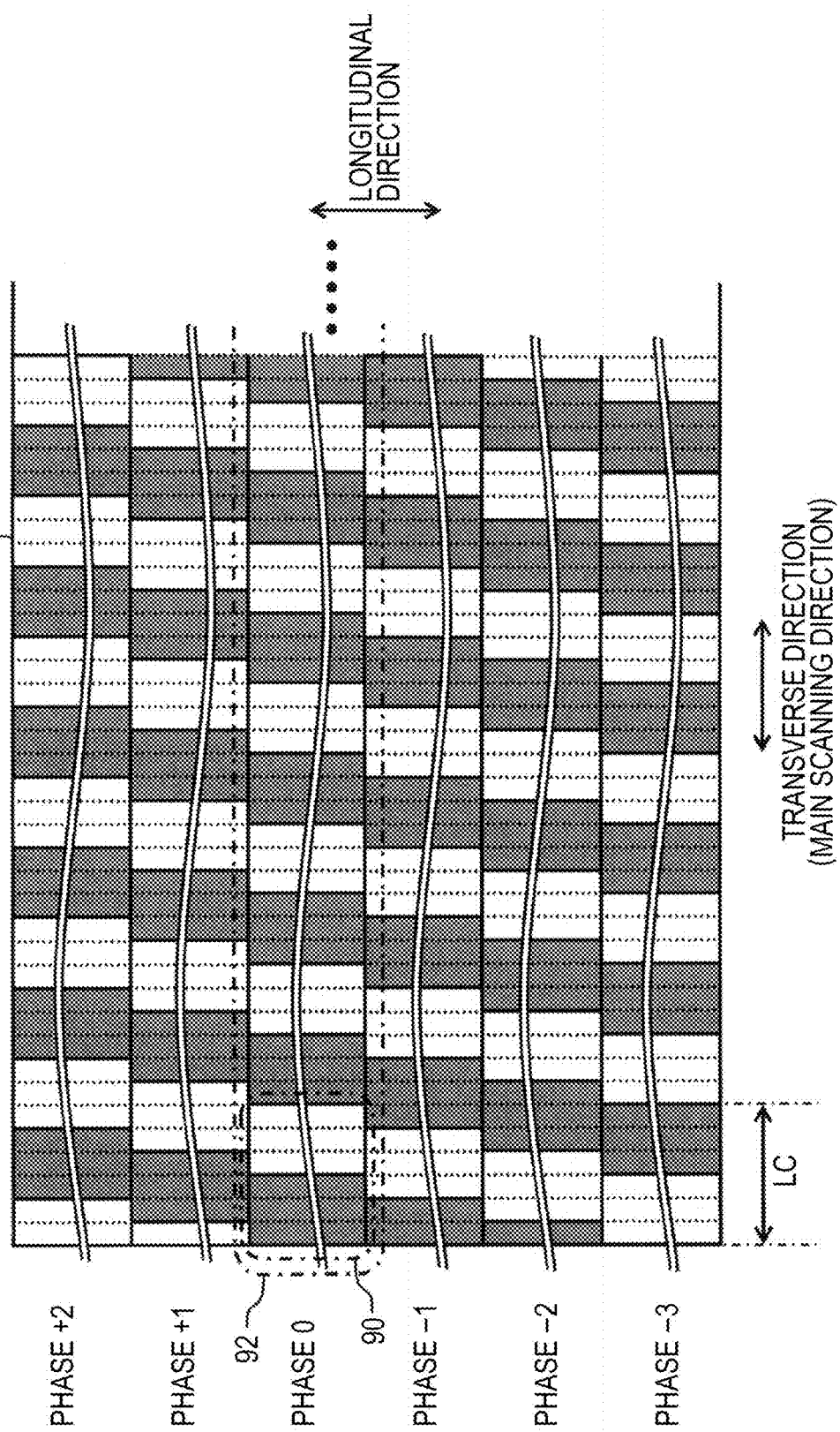
FIG. 10 is a drawing for explaining the pattern image.
Figure 11:
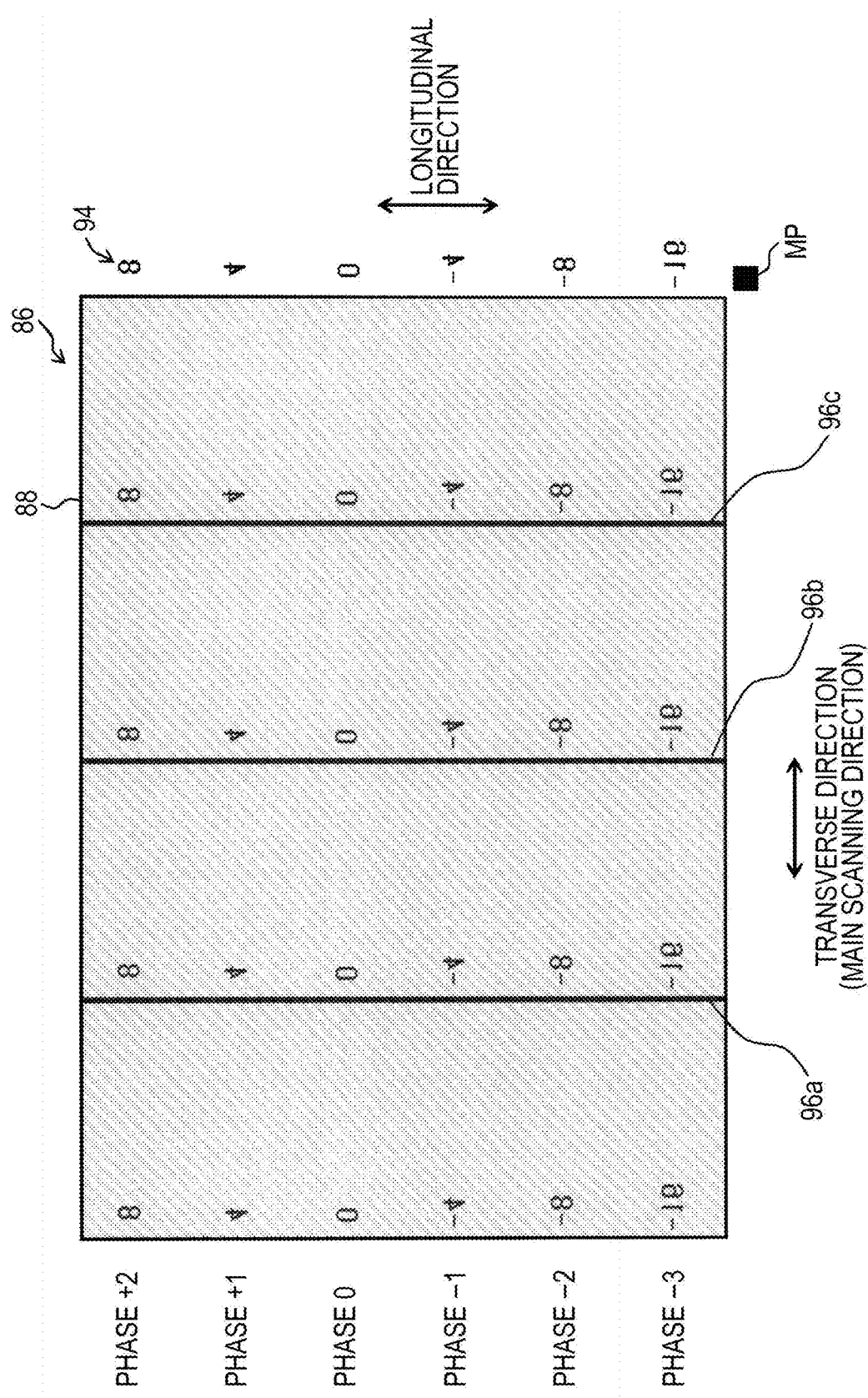
FIG. 11 schematically shows the overall pattern image.

As shown in FIG. 8, first, the operator forms a pattern image on the lenticular lens sheet 80 (S100). FIG. 9 shows a portion of a pattern image 86, FIG. 10 is a drawing for explaining the pattern image 86, and FIG. 11 schematically shows the overall pattern image 86. Note that multiple double wave lines illustrated in the lens longitudinal direction (top-bottom direction) in FIGS. 9 and 10 and bold dots on the right side in FIGS. 9 and 10 indicate that portions of the pattern image 86 are omitted and do not constitute the pattern image 86. Although the text "phase +2, +1, 0, −1, −2, −3", "longitudinal direction", and "transverse direction (main scanning direction)" and arrows in FIGS. 9, 10, 11, and FIG. 17 (described below) do not constitute the pattern image 86 in this exemplary embodiment, they may constitute the pattern image 86 in another exemplary embodiment.

FIG. 10 shows the pattern image 86 converted from the one in FIG. 9, wherein portions filled in black in FIG. 9 are filled in gray, and dotted lines and solid lines are added. Note that FIG. 10 is a drawing for explaining the pattern image 86 and is not the pattern image 86 itself. As shown in FIGS. 9 and 10, the pattern image 86 includes a frame line 88 and multiple periodic images 92 arranged within the frame line 88. The frame line 88 may be omitted. The white areas in the frame line 88 in FIG. 9 are transparent areas, where no image is formed. As shown in FIG. 10, the pattern image 86 includes the periodic images 92, in each of which set images 90, each including two or more images of different shades (in FIGS. 9 and 10, an image filled in black and a transparent image, where no image is formed) and having a length equal to the lens pitch LC of the lens sheet, are arranged in the lens transverse direction of the lens sheet. The periodic images 92 are arranged in the lens longitudinal direction of the lens sheet so as to be gradually shifted from one another in the lens transverse direction by a distance less than the lens pitch LC. In FIGS. 9 and 10, the periodic images 92 are arranged in the lens longitudinal direction so as to be gradually shifted from one another in the lens transverse direction by a distance of one-sixth of the lens pitch LC. The pattern image 86 is formed on the lens sheet such that the cycle of the set images 90 in the periodic image 92 labeled phase 0 agrees with the lens pitch LC of the lens sheet; that is, such that the set images 90 are located within the corresponding lenses 82 of the lenticular lens sheet 80, as shown in FIG. 7. Note that the phase values, such as phase +2, +1, and 0, indicated in FIG. 9 and other figures are given to the respective periodic images 92 and indicate the amount of shift relative to the phase-0 periodic image. The black-filled images in the set images 90 are parallel to the lens longitudinal direction.

In FIG. 11 (showing the overall pattern image 86), the periodic images 92 disposed within the frame line 88 in FIGS. 9 and 10 are simplified and shown by hatching. As shown in FIG. 11, the pattern image 86 includes: multiple adjustment values 94 for correcting the exposure device 14K, corresponding to positions in the lens longitudinal direction; multiple reading lines 96a, 96b, and 96c arranged at intervals in the lens transverse direction; and a mark MP for indicating the orientation of the lenticular lens sheet 80 when the lenticular lens sheet 80 is viewed from the lens side. The reason why the adjustment values 94 are indicated upside-down in FIG. 11 is to prevent the adjustment values 94 from being indicated upside-down when the lens sheet having the pattern image 86 is reversed and viewed from the lens side. The adjustment values 94 are set for the respective periodic images 92 and are associated with the phases of the periodic images. As shown in FIG. 11, the adjustment values 94 are indicated along the left and right lines of the frame line 88 of the pattern image 86 and along the reading lines 96a, 96b, and 96c.

The image information of the pattern image 86 is preliminarily stored as, for example, raster data in the storage unit 102 (see FIG. 2). The operator places a lens sheet on the manual-feed tray 70 (see FIG. 1) with the lens side facing down. At this time, the lens sheet is placed on the manual-feed tray 70 such that the lens transverse direction is equal to the main scanning direction of the exposure device 14K, and such that the lens longitudinal direction of the lens sheet is equal to the transport direction in the image forming apparatus 10. Then, the operator issues an instruction to form the pattern image 86 on the lens sheet through the touch screen or the like of the operation unit 104. The processor 101 reads the raster data of the pattern image 86 from the storage unit 102 and transmits the data to the exposure device 14K of the image forming unit 13K. Then, the exposure device 14K forms an electrostatic latent image of the pattern image 86 on the photoconductor drum 15K. The electrostatic latent image on the photoconductor drum 15K is developed and is first-transferred to the intermediate transfer belt 25. The lens sheet is transported from the manual-feed tray 70 to the intermediate transfer belt 25, where the toner image of the pattern image on the intermediate transfer belt 25 is second-transferred to the rear side of the lens sheet. The lens sheet goes through the fixing processing in the fixing device 37 and is discharged on the paper output tray 38.

Referring back to FIG. 8, after the pattern image 86 is formed on the lens sheet in step S100, the operator views the lens sheet having the pattern image from the lens side in step S102. Then, the adjustment values 94 at multiple positions, in the lens transverse direction, of a linear pattern having the same intensity, grasped by viewing, are acquired (read).

Figure 12:
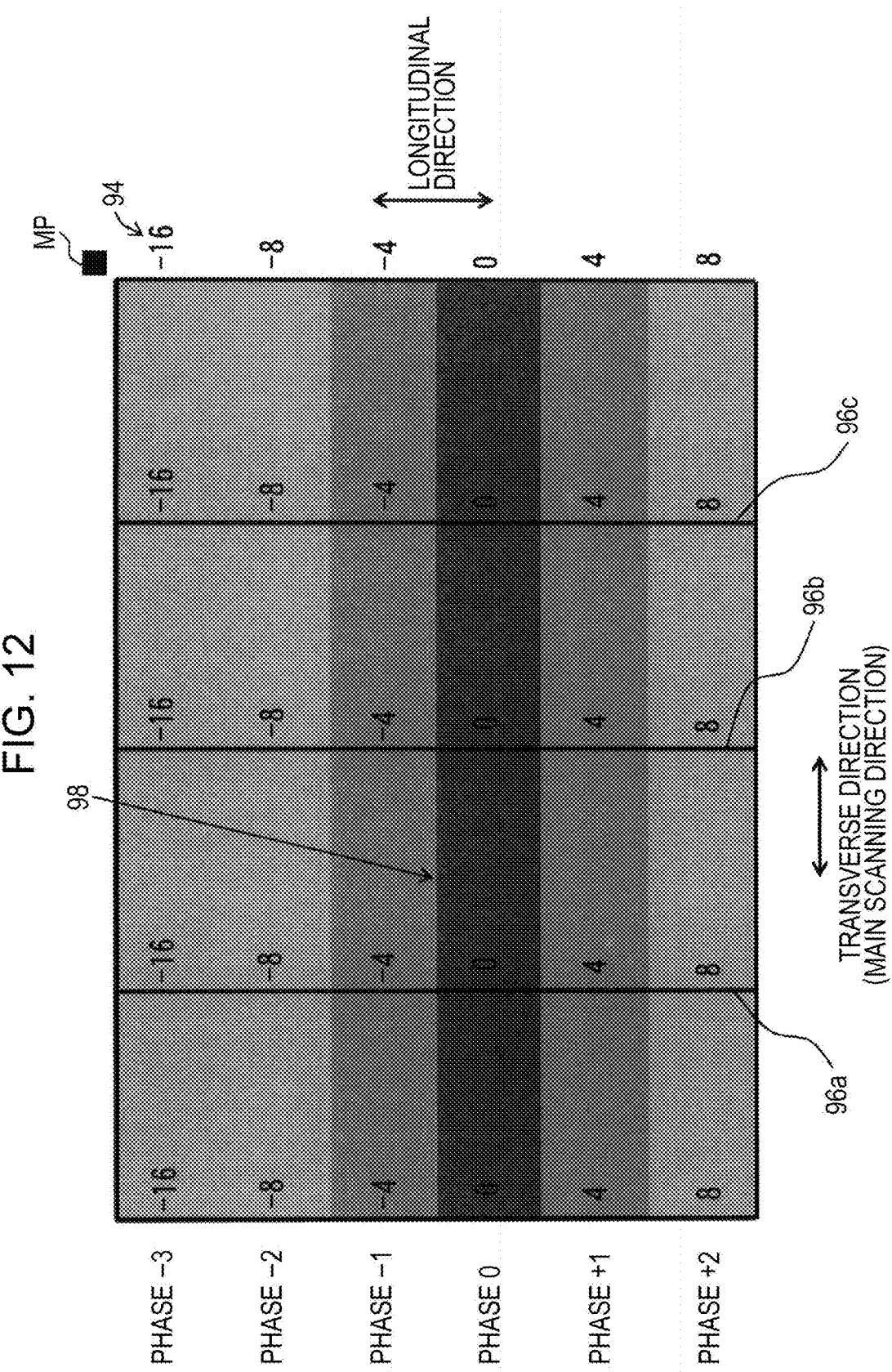
FIG. 12 shows an example of a linear pattern observed from a lens side of the lens sheet when there is no image displacement.
Figure 13:
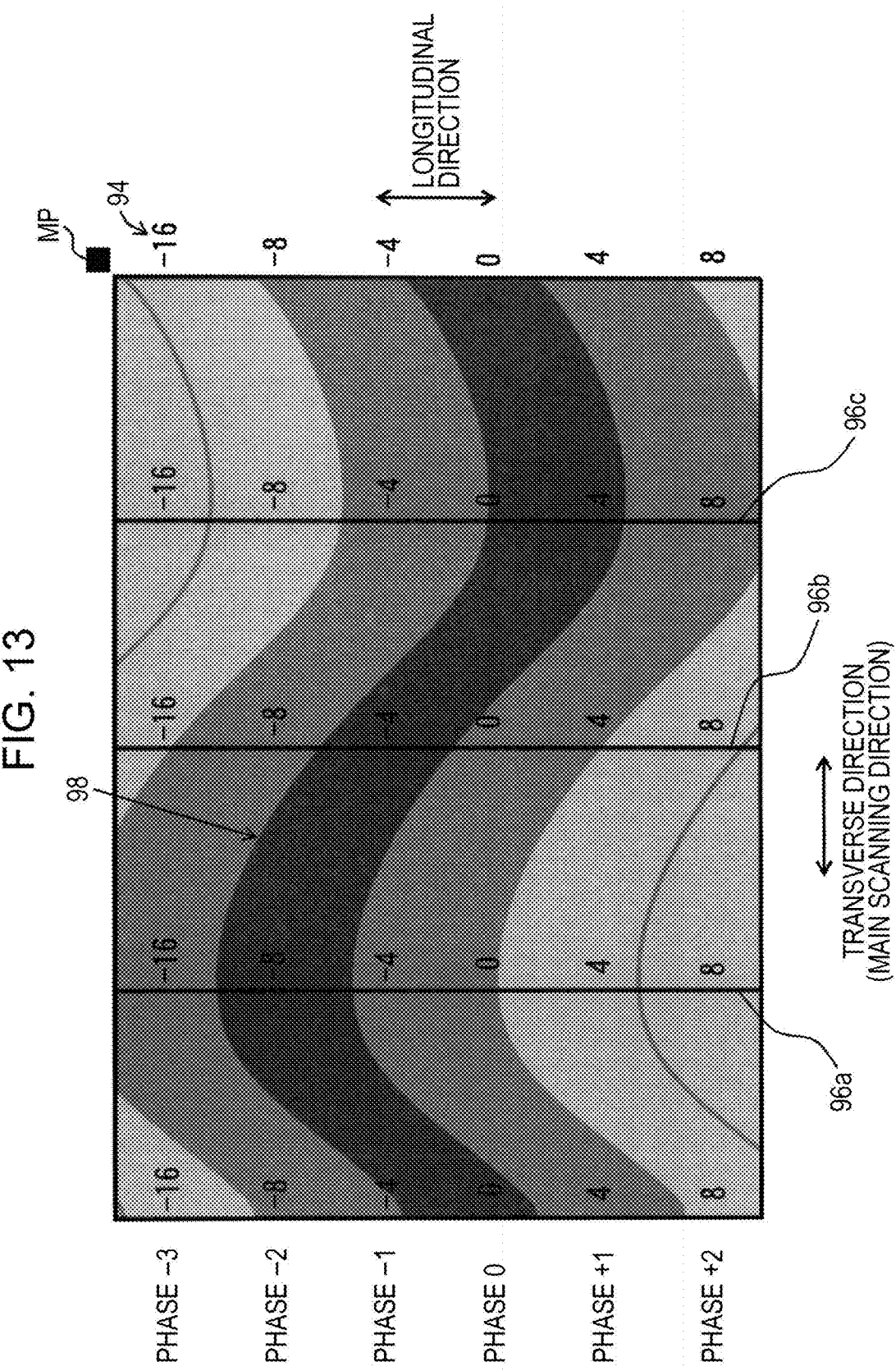
FIG. 13 shows an example of the linear pattern observed from the lens side of the lens sheet when there is image displacement.

FIG. 12 shows an example of a linear pattern 98 observed from the lens side of the lens sheet when there is no image displacement in the main scanning direction. FIG. 13 shows an example of the linear pattern 98 observed from the lens side of the lens sheet when there is image displacement in the main scanning direction. As shown in FIG. 12, when there is no image displacement in the main scanning direction, the positions of the set images in the phase-0 periodic image agree with the positions of the lenses of the lens sheet. Hence, the most intense black linear pattern 98 is observed in the area of the phase-0 periodic image. As the distance from the phase-0 periodic image increases in the lens longitudinal direction (i.e., as the absolute phase value increases), transparent areas in the pattern image are partially focused, and a state in which the intensity of black gradually decreases is observed. Furthermore, a state in which the most intense black linear pattern 98 extends parallel to the lens transverse direction in the area of the phase-0 periodic image is observed.

Meanwhile, when there is image displacement in the main scanning direction (i.e., when the image is shifted from the intended position), the most intense black linear pattern 98 is observed at a position away from the area of the phase-0 periodic image. Furthermore, if the displacement amount in the main scanning direction varies in the main scanning direction, as shown in FIG. 13, a winding linear pattern 98 is observed. This is because the most intense black is observed at positions where the positions of the set images agree with the lens pitch as a result of the displacement of the image forming position in the main scanning direction caused by the exposure device 14K and the phase shift of the periodic images cancelling each other. The farther, from the phase-0 periodic image, in the lens longitudinal direction, the position where the most intense black is observed, the greater the amount of displacement. The position in the lens longitudinal direction corresponds to the amount of displacement, and the adjustment values 94 indicated in the lens longitudinal direction are the correction amounts (adjustment amounts) for the exposure device 14K to cancel the displacement, or the values serving as the base of the correction amounts.

The operator reads the adjustment values 94 while disposing the lens sheet such that the mark MP on the pattern image 86 is located at a specific position (the upper right position in this exemplary embodiment). More specifically, the operator reads the adjustment values 94 in the most intense black area, at five positions (the left line of the frame line, the reading lines 96a, 96b, and 96c, and the right line of the frame line) in the main scanning direction. In this exemplary embodiment, a value between adjustment values (for example, −2 between −4 and 0) on the pattern image 86 is also treated as an effective adjustment value. In the example in FIG. 13, the operator reads, in this order from the left, −2, −8, −4, 2, and 0 as the adjustment values. These values are correction amounts of the exposure device 14K at the respective positions in the main scanning direction or the values serving as the base of the correction amounts.

Figure 14:
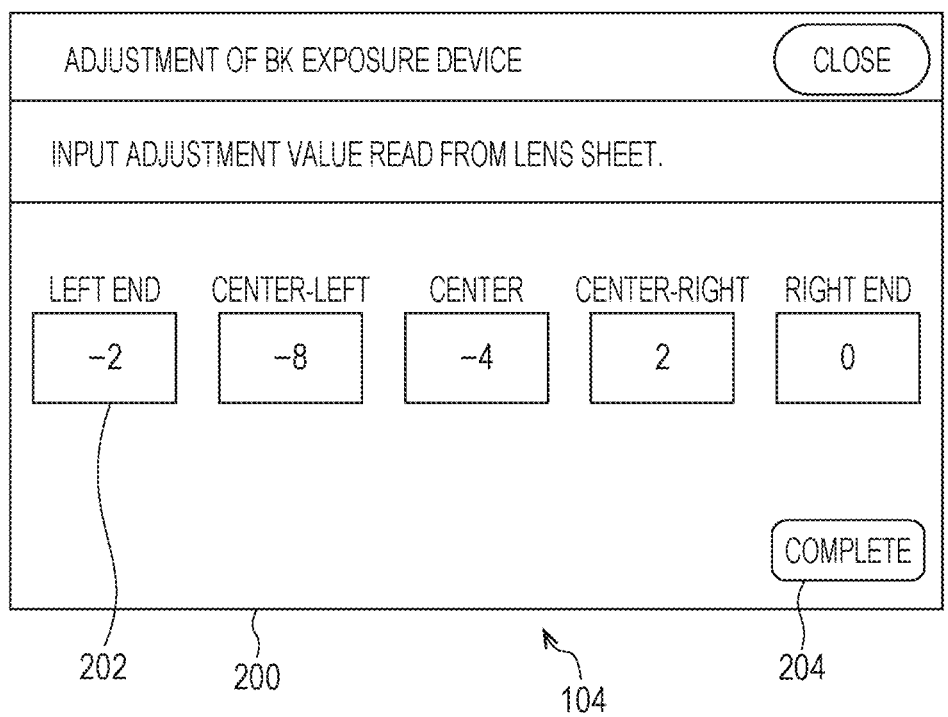
FIG. 14 shows an example of an operation screen.

Referring back to FIG. 8, after reading the adjustment values in step S102, the operator inputs the thus-read adjustment values to the image forming apparatus 10 through the operation unit 104 in step S104. FIG. 14 shows an example of an operation screen 200 displayed on the touch screen of the operation unit 104. For example, the operator successively selects boxes 202 in the operation screen 200 shown in FIG. 14 and inputs the adjustment values read in step S102 by using a keypad (not shown). In FIG. 14, the boxes are filled with the values −2, −8, −4, 2, and 0 read in the example of FIG. 13. The operator completes inputting by pressing a button 204 ("complete").

The processor 101 receives the multiple adjustment values inputted through the operation unit 104 and stores the values in the storage unit 102 in association with the positions in the main scanning direction. For example, when an image is to be formed on a new lens sheet, the processor 101 reads the adjustment values associated with the positions in the main scanning direction from the storage unit 102, applies the adjustment values so as to correspond to the positions in the main scanning direction in the raster data (also referred to as image information) to be inputted to the exposure device 14K, thereby changing the raster data, to correct the position in the main scanning direction where an electrostatic latent image is formed by the exposure device 14K. Alternatively, for example, the processor 101 may correct the position in the main scanning direction where an electrostatic latent image is formed by the exposure device 14K by applying the adjustment values to, instead of the image information, control signals for the exposure device 14K (for example, synchronizing signals or the like used when the exposure device 14K scans the laser beam in the main-scanning direction) so as to correspond to the positions in the main scanning direction to change the control signals. For a position in the main scanning direction about which the adjustment value is not inputted from the operation unit 104, the processor 101 may generate an adjustment value from the two adjustment values obtained on both sides of that position.

By performing the above-described flow in FIG. 8 also on the yellow, magenta, and cyan exposure devices 14, the positions in the main scanning directions where electrostatic latent images are formed by the exposure device 14Y, 14M, 14C are also corrected. Note that, when the flow in FIG. 8 is performed on the yellow, magenta, and cyan exposure devices 14, the black-filled images in the pattern image 86 are replaced with images filled in the corresponding colors.

According to the above-described exemplary embodiment, the main-scanning exposure positions with the respective exposure devices 14 agree with or approach the target positions. Hence, when an image is formed on the lenticular lens sheet with the image forming apparatus 10, the intended sense of perspective, stereoscopic sense, motion change, and the like is observable or becomes more likely to be observable on the lenticular lens sheet.

Although the flow in FIG. 8 is performed on each of the black, yellow, magenta, and cyan exposure devices 14 in the above-described exemplary embodiment, the flow may be performed only on the device (color) that needs to be corrected.

Although the pattern image 86 includes the adjustment values 94 in the above-described exemplary embodiment, the pattern image 86 does not necessarily have to include the adjustment values 94. Even in that case, when the linear pattern having the same intensity and extending in the lens transverse direction of the lens sheet is not parallel to the lens transverse direction when the lens sheet is viewed from the lens side, the presence of image-position displacement in the lens transverse direction can be detected. Hence, it is possible to know that image-position displacement in the lens transverse direction will occur when an image is formed on the lens sheet.

In the above-described exemplary embodiment, the set images 90 of the pattern image 86 each include a black-filled image and a transparent image, where no image is formed. However, the set images 90 may each include three or more images having different shades, and do not necessarily have to include a transparent image.

In the above-described exemplary embodiment, the adjustment values 94 on the pattern image 86 are read at five positions separated by substantially equal intervals in the main scanning direction. However, the reading positions of the adjustment values 94 on the pattern image 86 may be changed as appropriate. For example, the positions of the reading lines 96a, 96b, and 96c indicating the reading positions of the adjustment values 94 may be the positions of the detectors 60A, 60B, and 60C (see FIG. 3). Furthermore, for example, the positions of the reading lines 96a, 96b, and 96c may be the positions of the inflection points ip (see FIG. 5) in the amount of displacement with the exposure device 14. The adjustment values 94 of the above-described exemplary embodiment are merely an example, and the number of the adjustment values 94 included in the pattern image 86 and the values thereof may be changed as appropriate.

In the above-described exemplary embodiment, the adjustment values 94 on the pattern image 86 are inputted to the operation unit 104 (input unit). However, when the pattern image 86 includes the phase values (+2, +1, 0, −1, etc., shown in FIG. 9 and the like) of the periodic images 92, the phase values may be inputted to the operation unit 104 (input unit). In that case, for example, the lens pitch LC is preliminarily stored in the storage unit 102, the amount of displacement with the exposure device 14 is calculated from the lens pitch LC and the inputted phase values, and the exposure device 14 is corrected by the amount of displacement.

In the above-described exemplary embodiment, the periodic images 92 in the pattern image 86 are arranged in the lens longitudinal direction so as to be gradually shifted from each other in the lens transverse direction by a distance of one-sixth of the lens pitch LC. However, the way of shifting the periodic images 92 from one another may be changed as appropriate, and, for example, the periodic images 92 may be gradually shifted in the lens transverse direction by a distance of, for example, one-second, one-third, one-tenth, one-twentieth, etc. of the lens pitch LC.

Although the exposure devices 14 are corrected in the above-described exemplary embodiment, other portions of the image forming units 13 may be corrected (adjusted). Furthermore, although an image is formed on the lens sheet by using an electrophotographic image forming apparatus 10 in the above-described exemplary embodiment, the image forming apparatus 10 does not necessarily have to be an electrophotographic image forming apparatus. For example, an image may be formed on the lens sheet by using an ink jet image forming apparatus 10. In that case, the ink jet image forming apparatus 10 forms the pattern image 86, and the image forming section of the ink jet image forming apparatus 10 is corrected according to the read adjustment values.

Figure 15:
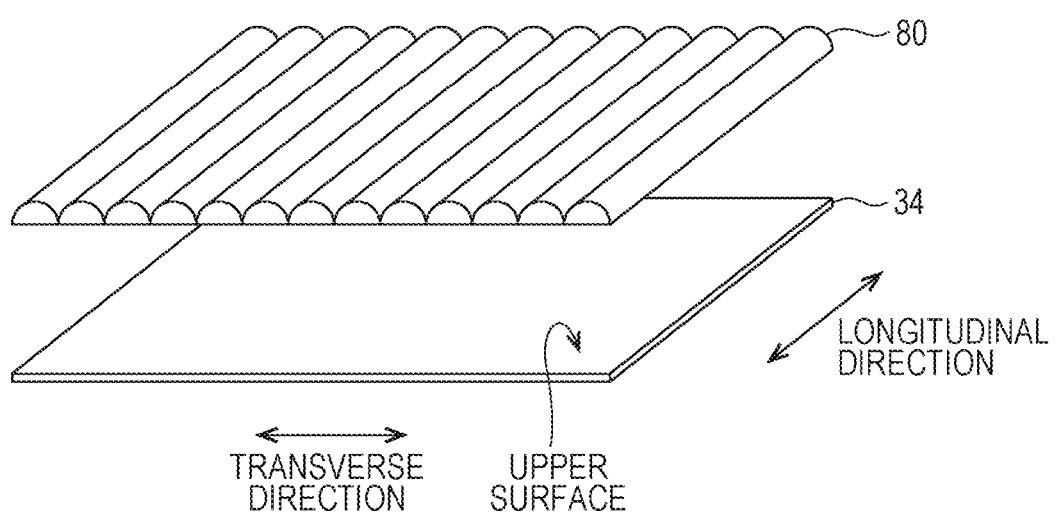
FIG. 15 shows a portion of another lenticular lens sheet.
Figure 16:
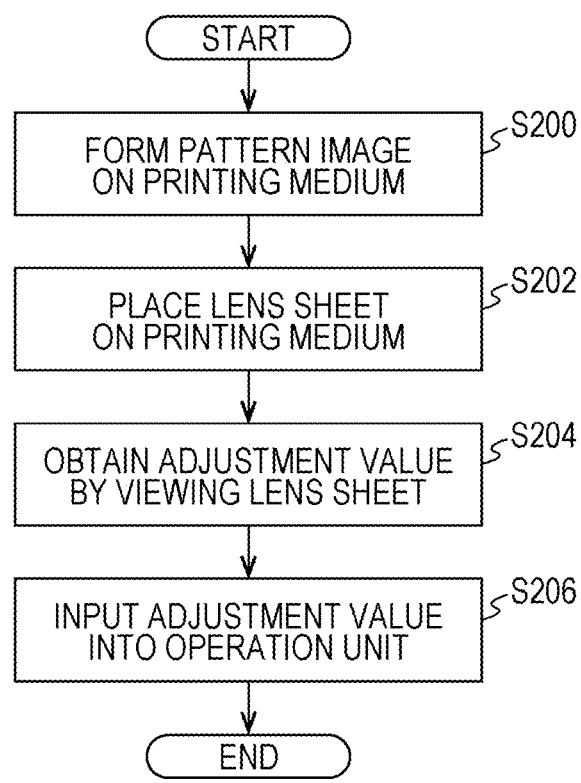
FIG. 16 is a flowchart showing a process in another exposure-device correcting method.

In the above-described exemplary embodiment, the pattern image 86 is directly formed on the lenticular lens sheet 80. However, as shown in FIG. 15, the pattern image 86 may be formed on the upper surface of a printing medium 34, which is different from the lenticular lens sheet 80, and the lenticular lens sheet 80 may be disposed on the printing medium 34 to enable detection of whether there is image displacement in the main scanning direction or to enable reading of the adjustment values. FIG. 16 shows a flowchart showing the process in the method of correcting the exposure device 14 in this case. In the flow in FIG. 16, step S100 "form pattern image on lens sheet" in the flow in FIG. 8 is replaced with "form pattern image on printing medium" (S200), and "place lens sheet on printing medium" (S202) is added to the flow in FIG. 8. Other steps (S204) and (S206) are the same as those in the flow in FIG. 8. In addition to "place lens sheet on printing medium" (S202), a step "bond lens sheet to printing medium" may be added. As shown in FIG. 15, in this exemplary embodiment, because the upper surface of the printing medium 34 and the lens side are on the same side, the adjustment values 94 included in the pattern image 86 do not need to be indicated upside-down, as in FIG. 11, and the pattern image 86 includes the adjustment values 94 indicated in the normal orientation, as shown in FIG. 17.

Methods of producing lenticular printed materials include a method in which an image is directly printed on a lenticular lens sheet and a method in which an image sheet having an image is bonded to a lenticular lens sheet. Although the above-described exemplary embodiment is based on the case where the image is directly formed on the lenticular lens sheet, the present disclosure may be applied to a case where an image sheet having an image is bonded to the lenticular lens sheet. In that case, by bonding the image sheet having the pattern image 86 to the lens sheet, whether there is image displacement in the main scanning direction is detected, and, by inputting the read adjustment values to the image forming apparatus, the image forming section is corrected.

In the above-described exemplary embodiments, the processor includes processors in a broad sense and includes general-purpose processors (for example, a central processing unit (CPU)) and dedicated processors (for example, a graphics processing unit (GPU), an application specific integrated circuit (ASIC), a field programmable gate array (FPGA), and a programmable logical device).

Furthermore, the operation of the processor in the above-described exemplary embodiments does not necessarily have to be implemented by a single processor, but may be cooperatively implemented by multiple processors that are physically apart from each other. The order of the operations performed by the processor is not limited to the order described in the above-described exemplary embodiment and may be modified as appropriate.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:
    an image forming section that forms a pattern image for detecting image-position displacement with respect to a lenticular lens sheet, wherein
    the pattern image includes periodic images in each of which set images, each including two or more images of different shades and having a length equal to a lens pitch of the lenticular lens sheet, are arranged in a lens transverse direction of the lenticular lens sheet, and
    the periodic images are arranged in a lens longitudinal direction of the lenticular lens sheet so as to be gradually shifted from one another in the lens transverse direction by a distance less than the lens pitch.

2. The image forming apparatus according to claim 1, wherein the pattern image includes adjustment values for adjusting the image forming section, the adjustment values corresponding to positions in the lens longitudinal direction.

3. The image forming apparatus according to claim 2, further comprising an input unit via which the adjustment values at multiple positions, in the lens transverse direction, of a linear pattern having the same intensity, the adjustment values being grasped by viewing the lenticular lens sheet having the pattern image from the lens side, are inputted,
    wherein the image forming section is adjusted on a basis of the adjustment values inputted to the input unit.

4. The image forming apparatus according to claim 3, wherein the image forming section includes multiple image forming sections that form, on the lenticular lens sheet, the pattern images corresponding to yellow, magenta, cyan, and black.

5. The image forming apparatus according to claim 3, wherein the set images include black-filled images.

6. The image forming apparatus according to claim 2, wherein the image forming section includes multiple image forming sections that form, on the lenticular lens sheet, the pattern images corresponding to yellow, magenta, cyan, and black.

7. The image forming apparatus according to claim 2, wherein the set images include black-filled images.

8. The image forming apparatus according to claim 1, wherein the image forming section includes multiple image forming sections that form, on the lenticular lens sheet, the pattern images corresponding to yellow, magenta, cyan, and black.

9. The image forming apparatus according to claim 1, wherein the set images include black-filled images.

10. A method comprising:
    forming a pattern image on a lenticular lens sheet by using an image forming apparatus, the pattern image including periodic images in each of which set images, each including two or more images of different shades and having a length equal to a lens pitch of the lenticular lens sheet, are arranged in a lens transverse direction of the lenticular lens sheet, the periodic images being arranged in a lens longitudinal direction of the lenticular lens sheet so as to be gradually shifted from one another in the lens transverse direction by a distance less than the lens pitch, the pattern image including adjustment values associated with positions in the lens longitudinal direction;

acquiring the adjustment values at multiple positions, in the lens transverse direction, of a linear pattern having the same intensity by viewing the lenticular lens sheet having the pattern image from the lens side; and inputting, to an input unit of the image forming apparatus, the thus-acquired adjustment values for adjusting the image forming apparatus.

11. A method comprising:

forming a pattern image on a printing medium by using an image forming apparatus, the pattern image including periodic images in each of which set images, each including two or more images of different shades and having a length equal to a lens pitch of a lenticular lens sheet, are arranged in a lens transverse direction of the lenticular lens sheet, the periodic images being arranged in a lens longitudinal direction of the lenticular lens sheet so as to be gradually shifted from one another in the lens transverse direction by a distance less than the lens pitch, the pattern image including adjustment values associated with positions in the lens longitudinal direction;

placing the lenticular lens sheet on the printing medium having the pattern image;

acquiring the adjustment values at multiple positions, in the lens transverse direction, of a linear pattern having the same intensity by viewing the lenticular lens sheet having the pattern image from the lens side; and inputting, to an input unit of the image forming apparatus, the thus-acquired adjustment values for adjusting the image forming apparatus.

\* \* \* \* \*